United States Patent
Jiang

(10) Patent No.: US 10,215,364 B2
(45) Date of Patent: Feb. 26, 2019

(54) HYBRID OPTICAL INTEGRATOR ASSEMBLY AND OPTICAL SYSTEM COMPRISING IT

(71) Applicants: Guangzhou Haoyang Electronic Co., Ltd., Guangzhou (CN); Weikai Jiang, Guangzhou (CN)

(72) Inventor: Weikai Jiang, Guangzhou (CN)

(73) Assignees: Guangzhou Haoyang Electronic Co., Ltd. (CN); Weikai Jiang (CN)

(*) Notice: Subject to any disclaimer, the term of this patent is extended or adjusted under 35 U.S.C. 154(b) by 18 days.

(21) Appl. No.: 15/312,453

(22) PCT Filed: Apr. 28, 2015

(86) PCT No.: PCT/CN2015/077669
§ 371 (c)(1),
(2) Date: Nov. 18, 2016

(87) PCT Pub. No.: WO2015/176595
PCT Pub. Date: Nov. 26, 2015

(65) Prior Publication Data
US 2017/0089544 A1    Mar. 30, 2017

(30) Foreign Application Priority Data
May 20, 2014 (CN) .......................... 2014 1 0213773

(51) Int. Cl.
*F21V 5/00* (2018.01)
*F21V 7/00* (2006.01)
(Continued)

(52) U.S. Cl.
CPC ............ *F21V 7/0091* (2013.01); *F21V 5/002* (2013.01); *F21V 7/06* (2013.01); *G02B 6/0008* (2013.01);
(Continued)

(58) Field of Classification Search
CPC .... F21V 7/0091; F21V 5/002; G02B 27/0994
See application file for complete search history.

(56) References Cited

U.S. PATENT DOCUMENTS 4,818,049 A * 4/1989 Assenheim .............. G02B 6/32
                                                                 359/900
7,954,962 B2   6/2011 Mizushima et al.
(Continued)

FOREIGN PATENT DOCUMENTS

CN         1831580 A       9/2006
CN       101006556 A       7/2007
(Continued)

OTHER PUBLICATIONS

International Search Report for Application No. PCT/CN2015/077669 dated Jul. 9, 2015.

*Primary Examiner* — Evan P Dzierzynski
(74) *Attorney, Agent, or Firm* — Lerner, David, Littenberg, Krumholz & Mentlik, LLP

(57) ABSTRACT

A hybrid optical integrator assembly and an optical system comprising it. The hybrid optical integrator assembly comprises an optical integrator (21) and a scattering element (22) which is disposed on any cross section of the optical integrator (21) and performs scattering process to a light beam passing through. The hybrid optical integrator assembly is able to shorten a processing path of the optical integrator, so that the optical integrator has a smaller size.

2 Claims, 9 Drawing Sheets

(51) Int. Cl.
*F21V 7/06* (2006.01)
*F21V 8/00* (2006.01)
*G02B 27/09* (2006.01)
*G03B 21/20* (2006.01)

(52) U.S. Cl.
CPC ....... *G02B 27/0994* (2013.01); *G03B 21/208* (2013.01)

(56) References Cited

U.S. PATENT DOCUMENTS

| | | | |
|---|---|---|---|
| 2003/0099108 A1* | 5/2003 | Slobodin | G02B 26/008 362/293 |
| 2003/0156266 A1 | 8/2003 | Tanitsu | |
| 2004/0041984 A1* | 3/2004 | Tani | F21V 7/0091 353/20 |
| 2006/0039160 A1* | 2/2006 | Cassarly | A47F 11/10 362/551 |
| 2006/0215247 A1 | 9/2006 | Koide | |
| 2008/0030852 A1 | 2/2008 | Shigematsu | |
| 2008/0247182 A1* | 10/2008 | Yasuda | B60Q 1/076 362/465 |
| 2010/0165307 A1* | 7/2010 | Mizushima | G02B 26/105 353/98 |

FOREIGN PATENT DOCUMENTS

| | | |
|---|---|---|
| CN | 101233443 A | 7/2008 |
| CN | 203880611 U | 10/2014 |
| CN | 104154495 A | 11/2014 |
| JP | 2010169723 A | 8/2010 |

\* cited by examiner

HYBRID OPTICAL INTEGRATOR ASSEMBLY AND OPTICAL SYSTEM COMPRISING IT

CROSS REFERENCE TO RELATED APPLICATIONS

The present application is a national phase entry under 35 U.S.C. § 371 of International Application No. PCT/CN2015/077669, filed Apr. 28, 2015, which claims priority from Chinese Patent Application No. 201410213773.8, filed May 20, 2014, all of which are hereby incorporated herein by reference.

TECHNICAL FIELD

The present invention relates to a hybrid optical integrator assembly and an optical system thereof.

BACKGROUND

In an optical system of the field of stage lighting, due to various influencing factors, formed light spots projected by stage lighting are often found in problems of non-uniform luminance (overall non-uniform), black spots (locally non-uniform) and so forth when stage lighting is used for projecting light beam toward a stage or other target regions. To solve the above problems, in the prior art, as shown in FIG. 1, an optical integrator 2, such as a light-guiding pipe or a light-guiding rod, a microlens array, or an atomization piece, is generally disposed between a light source assembly 1 and an object assembly 3 to obtain relatively uniform light spots. Wherein, a concentrated beam is emitted by said light source assembly 1, becomes uniform via the optical integrator assembly 2, and then is shot after entering into the object assembly 3.

In normal conditions, however, if only the optical integrator is used, such as a light-guiding pipe or a light-guiding rod, the required length is relatively long, since the uniformity problems of the light spots eventually projected by the light-guiding pipe or light-guiding rod are closely bound up with the size of the light-guiding rod.

Usually, in order to achieve desired effects, the length of the light-guiding pipe or light-guiding rod will be relatively long. In this case, when designing stage lighting, the size of the optical integrator (e.g. light-guiding pipe or light-guiding rod and so forth) needs to be designed fairly long if a better uniformity of light spots is required. The optical integrator occupies more space, causing that both other light source modules and the optical integrator (e.g. light-guiding pipe or light-guiding rod and so forth) need to be designed to avoid the optical integrator, such that it fails to obtain the ideal design. Moreover, as shown in FIG. 2, the light beam processed with the existing optical integrator still shines according to certain rule and direction, without realizing complete scattering, and there often will be a locally non-uniform phenomenon in the formed light spots.

SUMMARY OF THE PRESENT INVENTION

The technical problem to be solved by the present invention is to provide a hybrid optical integrator assembly and an optical system thereof with relatively small space is occupied and certain uniformity conditions are met.

In order to solve the above-described technical problem, the following technical solutions have been adopted in the present invention: a hybrid optical integrator assembly, comprising an optical integrator, wherein the hybrid optical integrator assembly further comprises a scattering element which is disposed on any cross section of the optical integrator and performs scattering process to a light beam passing through. In the present solution, by means of disposing the scattering element in the optical integrator, the scattering process of the light could be improved within the optical integrator or an end of the optical integrator, such that the light uniforming efficiency of the light becomes higher, and that a processing path of the optical integrator is shortened under the premise of meeting certain illumination uniformity, so that the optical integrator has a smaller size. In addition, under the combined effect of the optical integrator and the scattering element, it may make the projected light not only realizing overall uniformity, but realizing local uniformity as well, with shadow problem of the light spots being solved.

Specifically, said scattering element is a scattering flat glass sheet, or a scattering surface integral with a cross section of the optical integrator. Said optical integrator is a hollow light-guiding pipe or a solid light-guiding rod.

Further, said scattering flat glass sheet is embedded in the cross section inside the optical integrator. As preferably, said scattering flat glass sheet is located at a middle position inside the optical integrator, and is disposed perpendicular to an optic axis of the optical integrator. Certainly, said scattering flat glass sheet may also be disposed at an input end or an output end of the optical integrator.

Said scattering flat glass sheet is plated with optical films on both surfaces, to increase the transmittance of the scattering transmission glass sheet.

Simultaneously, the present invention provides an optical system according to said hybrid optical integrator assembly, comprising a light source assembly, a hybrid optical integrator assembly and an object assembly which locate in a same primary optical axis direction. A concentrated beam is emitted by said light source assembly, becomes uniform via the hybrid optical integrator assembly, and then is shot after entering into the object assembly. In the present solution, using the hybrid optical integrator assembly to uniform the light, the size of the optical integrator assembly could be reduced under the premise of meeting the optical system certain uniformity, so that the size of the whole device may be effectively reduced.

Said light source assembly comprises a light source and a light concentrating system, the light concentrating system being used for performing concentrating process to the light emitted by the light source. The input end of said optical integrator is located adjacent to a concentrated focus of the light of the light source assembly.

In comparison with the prior art, the beneficial effects of the present invention are as follows:

In the present invention, by mean of disposing the scattering element within the optical integrator, a processing path of the optical integrator is shortened under the premise of meeting certain illumination uniformity, so that the optical integrator has a smaller size. In addition, making use of the optical integrator with the scattering element, i.e. the optical system with the hybrid optical integrator assembly, the size of the whole device may be effectively reduced, so that the whole device becomes lighter and handier, and sufficient space may be provided for other components inside the whole device, with good design being done. Moreover, by means of the scattering effect of the scattering element, local uniformity of the light spots may be greatly improved, so that the light spots after being processed could not only realize overall uniformity, but also realize local uniformity.

DETAILED DESCRIPTION OF THE PREFERED EMBODIMENT

The present invention is further described below in combination with specific embodiments.

Embodiment 1

Figure 1:
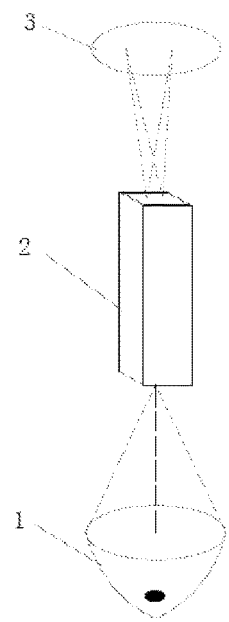
FIG. 1 is a schematic view of the prior art.
Figure 2:
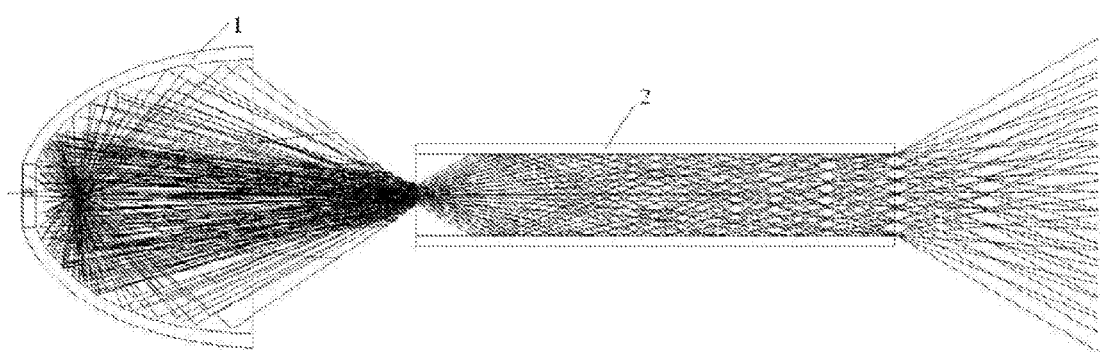
FIG. 2 is a schematic diagram of the light effect of the prior act.
Figure 3:
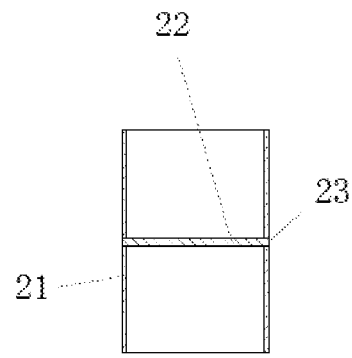
FIG. 3 is a schematic view of the hybrid optical integrator assembly of embodiment 1.
Figure 7:
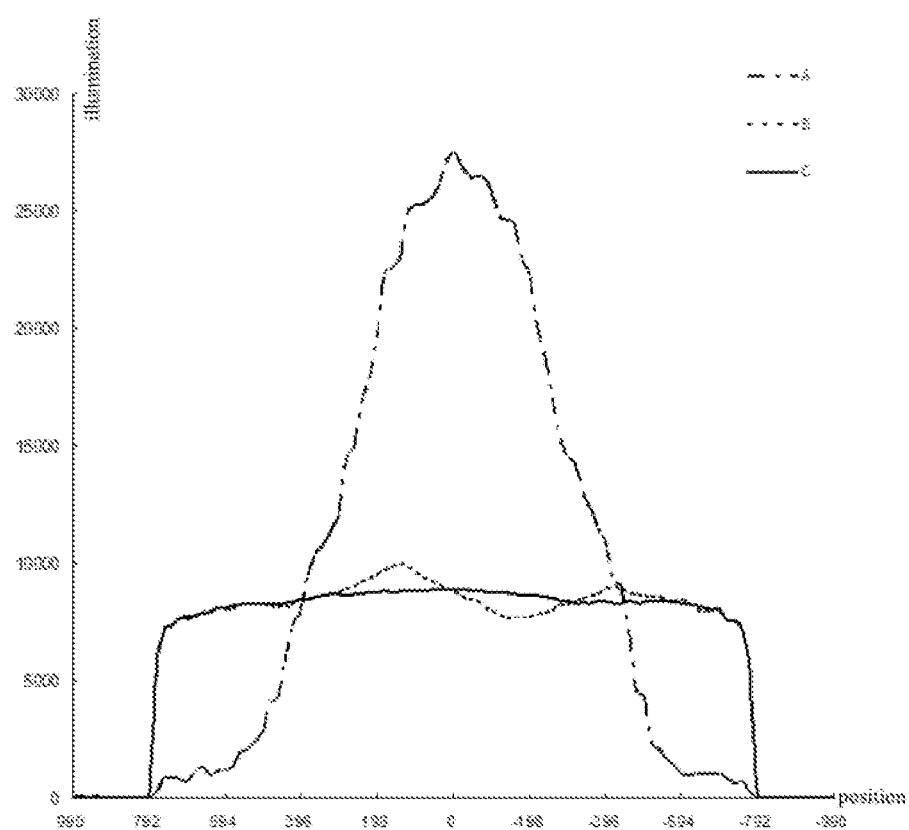
FIG. 7 is a diagram of experimental curves of the illumination distribution.

As shown in FIG. 3, the present invention discloses a hybrid optical integrator assembly, which comprises an optical integrator 21, wherein, the hybrid optical integrator assembly further comprises a scattering element 22 which is disposed on any cross section of the optical integrator and performs scattering process to a light beam passing through. In the present invention, by means of disposing the scattering element 22 in the optical integrator 21, the scattering process of the light could be improved within the optical integrator or an end of the optical integrator, such that the light uniforming efficiency of the light becomes higher, and that a processing path of the optical integrator is shortened under the premise of meeting certain illumination uniformity, so that the optical integrator has a smaller size. In addition, as a separate optical integrator, after the diverging light entering into which and being processed, the brightness of the middle light spots of the outgoing light is usually much greater than that of the peripheral light spots. The calculating method of the uniformity is as follows: uniformity of the light spot=average illumination/maximum illumination, It can be known that, if maximum illumination is much greater than average illumination, the uniformity of light spots is also undesirable. As to the hybrid optical integrator assembly of the present invention, the brightness of the middle light spots of the processed light is relatively close to that of the peripheral light spots, with its local uniformity being smaller, which can effectively solve the shadow problem of the light spots. In experimental curves of the illumination distribution as shown in FIG. 7, dash-dot curve A represents a curve of illumination distribution generated without any optical integrator, dotted curve B represents a curve of illumination distribution generated with the optical integrator of the prior art, and solid curve C represents a curve of illumination distribution generated with the hybrid optical integrator assembly of the present invention. It is thus clear that, as for the dash-dot curve A, that is, under the circumstance that none optical integrator is used, the generated curve of illumination distribution is not smooth enough, having a bigger fluctuation, and there is a relatively large difference between the maximum and minimum values, with overall illumination distribution being non-uniform; as for the dotted curve B, that is, under the circumstance that the optical integrator of the prior art is used, although the generated curve of illumination distribution is not smoother than the curve generated without any optical integrator (i.e. a certain degree of the effect that the overall distribution of light is uniform may be met), there exists a phenomenon of bigger fluctuation in local, overall uniformity of illumination being not good enough, and defects of locally non-uniform in the light; while the curve of the present invention is overall smooth, and the local fluctuation is relatively small, with not only an effect of overall uniformity, uniform illumination distribution, good illumination intensity being realized, but local uniformity also being realized.

Figure 8:
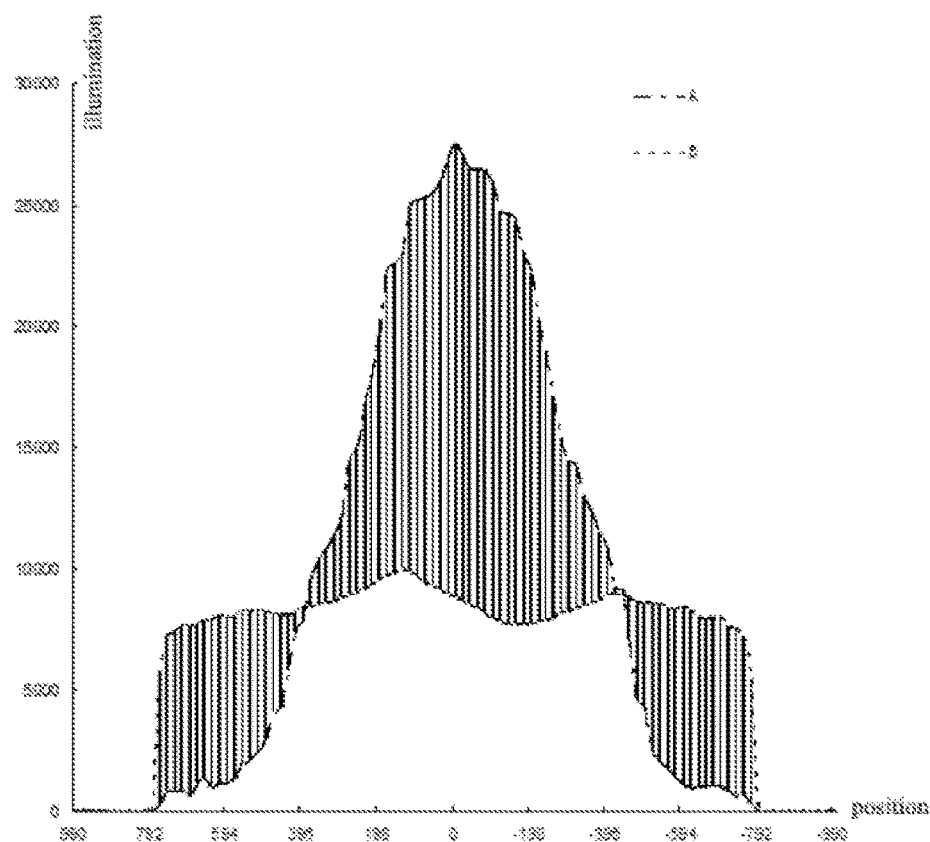
FIG. 8 is a comparison diagram of the experimental curves of the illumination distribution of two kinds of prior arts.

As shown in FIG. 8, which is a comparison diagram of illumination distribution of the prior art without optical integrator and the prior art with prior optical integrator. The dash-dot curve A represents a curve of illumination distribution generated without any optical integrator, and dotted curve B represents a curve of illumination distribution generated with the optical integrator of the prior art. It is thus clear that, as for the dash-dot curve A, that is, under the circumstance that none optical integrator is used, the generated curve of illumination distribution is not smooth enough, having a bigger fluctuation, and there is a relatively large difference between the maximum and minimum values, with overall illumination distribution being non-uniform; as for the dotted curve B, that is, under the circumstance that the optical integrator of the prior art is used, the generated curve of illumination distribution is not smoother than the curve generated without any optical integrator (i.e. a certain degree of the effect that the overall distribution of light is uniform may be met).

Figure 9:
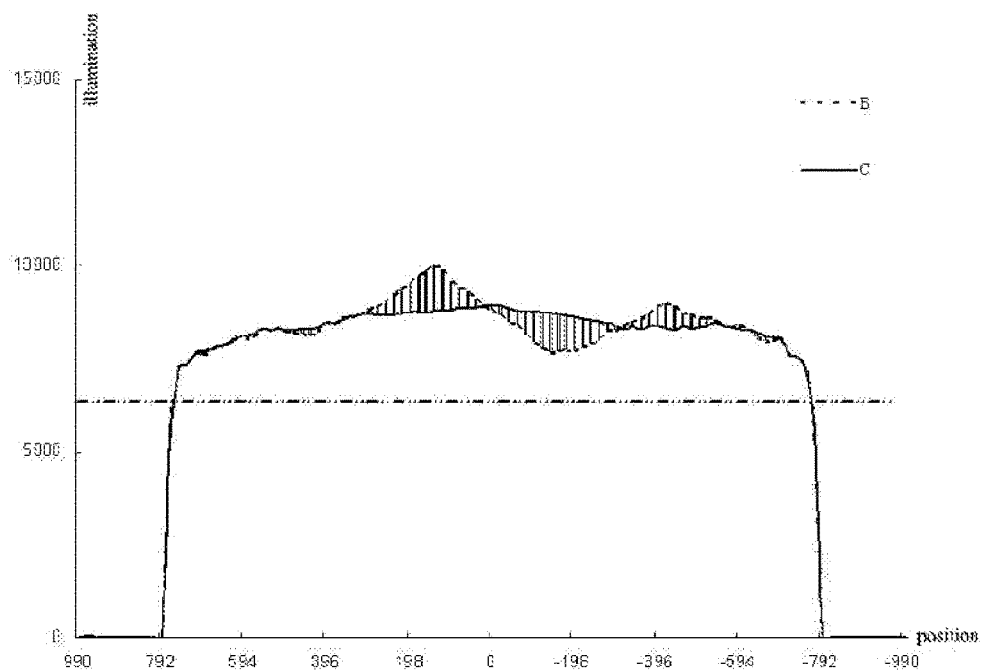
FIG. 9 is a comparison diagram of the experimental curves of illumination distribution of the hybrid optical integrator according to the present invention and the optical integrator according to the prior art.

As shown in FIG. 9, the dotted curve B represents a curve of illumination distribution generated with the optical integrator of the prior art, and the solid curve C represents a curve of illumination distribution generated with the hybrid optical integrator assembly of the present invention, in which, the average illumination values of two curves are the same. As the double dots dash curve shown in FIG. 9, it can be seen from the figure that, both have the same average illumination values. Although the optical integrator of the prior art improves the phenomenon of overall non-uniformity to some extent, there still is a phenomenon of locally non-smooth and curve with fluctuation in the dotted curve B, that is, there are defects in the light spots generated by the optical integrator of prior art, in particular, the phenomenon of local non-uniformity is relatively obvious in the centre part of the light spots; while curve C is relatively smooth, with relatively small fluctuation. That is to say, employing the hybrid optical integrator assembly of the present invention could effectively solve the problem of local non-uniformity of the light spots.

Figure 10:
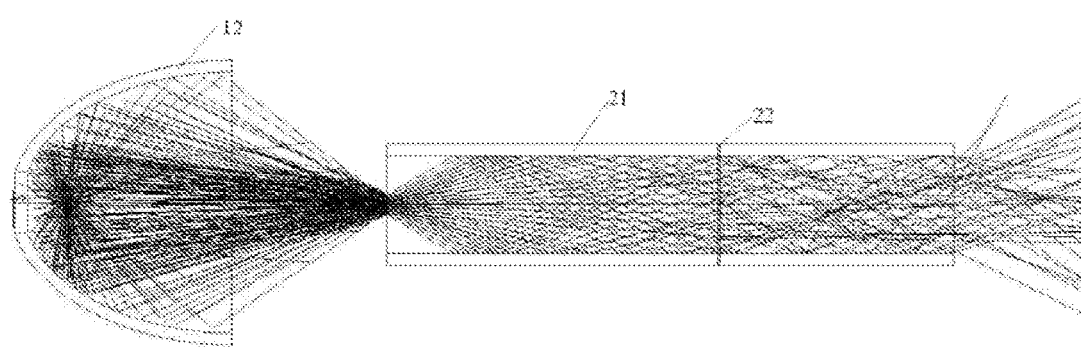
FIG. 10 is a schematic diagram of the light effect according to embodiment 1.

As shown in FIG. 10, employing the hybrid optical integrator assembly of the present invention, the light beam could be completely scattered, so that the light beam is shot out along every irregular directions, and thereby makes the generated light spots not only being overall uniform, but being locally uniform as well.

In the present embodiment, as shown in FIG. 3, said scattering element 22 is a scattering flat glass sheet. Said optical integrator 21 is a hollow light-guiding pipe.

Further, said scattering flat glass sheet is embedded in the cross section inside the optical integrator. As most preferably, said scattering flat glass sheet may be located at a middle position inside the optical integrator, and be disposed perpendicular to an optic axis of the optical integrator.

Said scattering flat glass sheet is a transmission glass sheet which can generate scattering, including but not limited to a frosted glass sheet, a nashiji glass sheet and an atomization mirror. Said scattering flat glass sheet may be plated with optical films on both surfaces.

Figure 4:
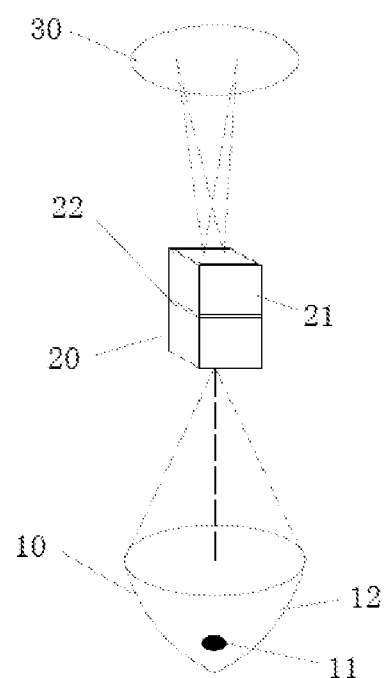
FIG. 4 is a schematic view of the optical system according to embodiment 1.

In the meantime, as shown in FIG. 4, the present invention provides an optical system according to said hybrid optical integrator assembly, comprising a light source assembly 10, a hybrid optical integrator assembly 20 and an object assembly 30 which locate in a same primary optical axis direction. An output end of the object assembly 30 may also be provided with an imaging system, to vary an imaging focal length of the light beam. A concentrated beam is emitted by said light source assembly 10, becomes uniform via the hybrid optical integrator assembly 20, and then is shot after entering into the object assembly 30. In the present invention, after the light is emitted from the light source assembly 10, a light beam having highly concentrated light density and a certain divergence angle is formed at the input port of said hybrid optical integrator assembly 20. After the light beam with highly concentrated light density passes through the hybrid optical integrator assembly 20, the overall uniformity and local uniformity of the light beam may be improved, and the size may be reduced simultaneously relative to using single integrator, causing that the light beam outputted from the imaging system achieves an effect of relative uniformity.

Said light source assembly 10 comprises a light source 11 and a light concentrating system 12. The light concentrating system 12 serves to perform converging to the light emitted from the light source 11. An input end of said optical integrator 21 is located adjacent to a concentrated focus of the light of the light source assembly 10. Specifically, said light concentrating system 12 is a reflector.

Figure 5:
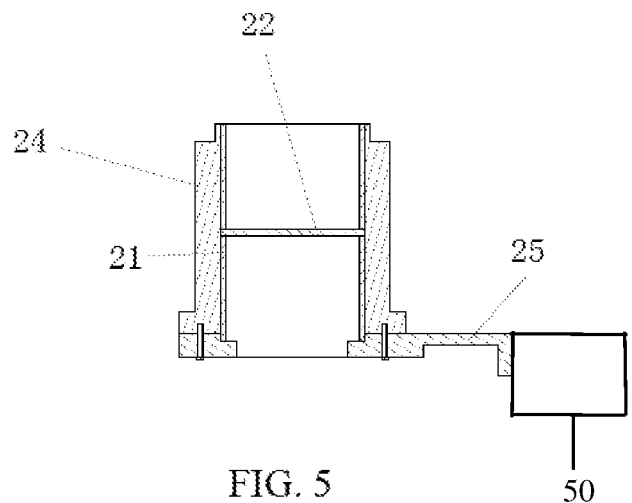
FIG. 5 is a schematic view of an installation of the hybrid optical integrator assembly according to embodiment 1.

Preferably, as shown in FIG. 5, the optical integrator 21 is sheathed on a fixing frame 24 of the optical integrator, and is fixed by the fixing frame 24 of the optical integrator. A connecting frame 25 is provided at an end of the fixing frame 24 of the optical integrator, and the optical integrator 21 is in connection with a mobile driving mechanism 50 via the connecting frame 25. While using stage lighting, when the hybrid optical integrator assembly 20 is required to be used for processing the light beam, the hybrid optical integrator assembly 20 may be moved into a light path between the light concentrating system 12 (reflector) and the object assembly 30 by the mobile driving mechanism, causing that the light beam passes through the hybrid optical integrator assembly 20 and then enters into the object assembly 30, to perform uniforming process to the light beam; when the hybrid optical integrator assembly 20 is not required to be used for processing the light beam, the hybrid optical integrator assembly 20 may be moved out of the light path between the light concentrating system 12 (reflector) and the object assembly 30 by the mobile driving mechanism. Said mobile driving mechanism 50 may be adopted a conventional screw motor driving mechanism.

Preferably, the hollow light-guiding pipe and the scattering flat glass sheet may be connected by plastering.

Figure 6:
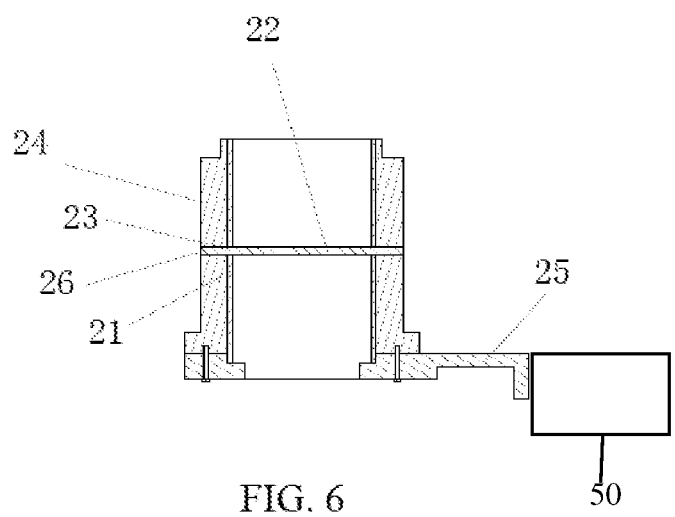
FIG. 6 is a schematic view of another installation of the hybrid optical integrator assembly according to embodiment 1.

Further, as shown in FIG. 3, an opening 23 may be provided at both side of the hollow light-guiding pipe, with the scattering flat glass sheet being inserted from said opening 23 and scarfing with the hollow light-guiding pipe. Further, as shown in FIG. 6, a second opening 26 may be provided at a position of the optical integrator fixing frame 24 corresponding to the opening 23 of the hollow light-guiding pipe, facilitating the scattering flat glass sheet inserting into above-described opening 23 from this second opening 26, to complete the installation of the scattering flat glass sheet.

Embodiment 2

Figure 11:
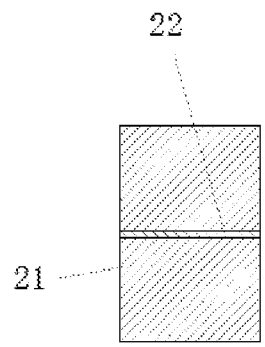
FIG. 11 is a schematic view of the hybrid optical integrator assembly according to embodiment 2.
Figure 12:
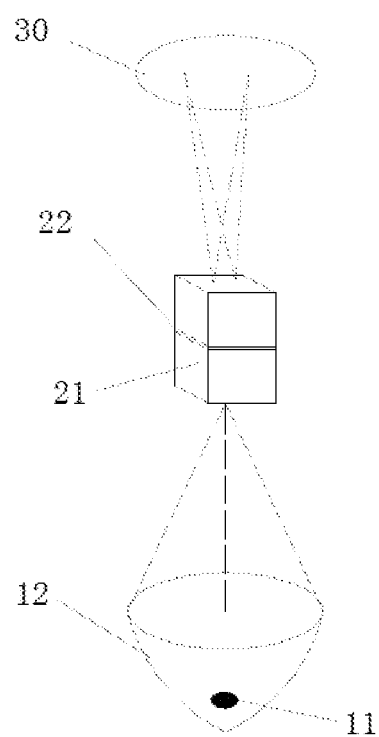
FIG. 12 is a schematic view of the optical system according to embodiment 2.

The structure of the present embodiment is similar to that of the embodiment 1, with differences lying in that, said optical integrator 21 is a solid light-guiding rod. As shown in FIG. 11 and in FIG. 12, said scattering flat glass sheet may be embedded onto a cross section of a middle part inside the solid light-guiding rod, and the scattering flat glass sheet may be perpendicular to a central axis of the solid light-guiding rod, so that the light beam emitted by the light source passes through the scattering flat glass sheet, and then is shot by an output port of the solid light-guiding rod.

When the optical integrator adopts the solid light-guiding rod, in addition to that the above-described scattering flat glass sheet may be embedded into onto the cross section of the middle part inside the solid light-guiding rod, the solid light-guiding rod may also be separated into two parts as a two-section structure, and a scattering surface is used at a joint surface of two sections of the light-guiding rod for substituting the above-described scattering flat glass sheet.

Embodiment 3

Figure 13:
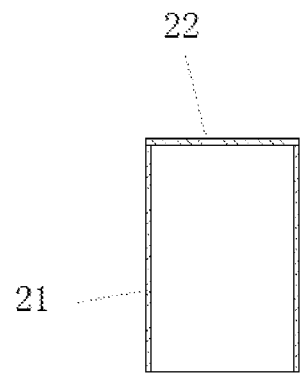
FIG. 13 is a schematic view of the hybrid optical integrator assembly according to embodiment 3.
Figure 14:
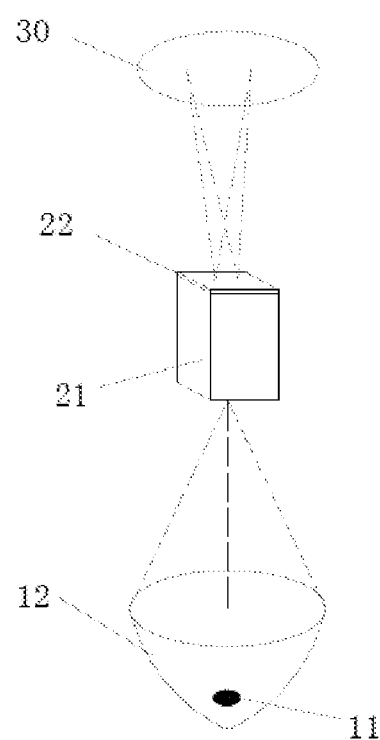
FIG. 14 is a schematic view of the optical system according to embodiment 3.

The structure of the present embodiment is similar to that of the embodiment 1, with differences lying in that, as shown in FIG. 13 and FIG. 14, said scattering flat glass sheet may also be disposed at an input end or an output end of the optical integrator, and said optical integrator may be a hollow light-guiding pipe or a solid light-guiding rod. When being the solid light-guiding rod, the scattering flat glass sheet may also be substituted as a scattering surface and thereby be directly disposed on the input end or output end.

Embodiment 4

Figure 15:
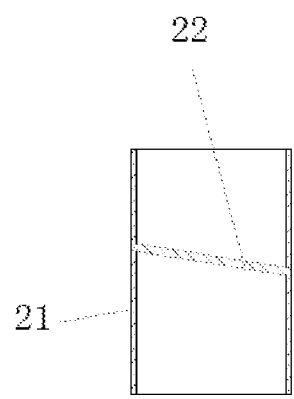
FIG. 15 is a schematic view of the hybrid optical integrator assembly according to embodiment 4.

The structure of the present embodiment is similar to that of the embodiment 1, with differences lying in that, said optical integrator may be a hollow light-guiding pipe with its inner wall being plated with an efficient optical reflection film. In addition, as shown in FIG. 15, said scattering flat glass sheet is embedded into the hollow light-guiding pipe, and covers on the cross section of the middle part inside the hollow light-guiding pipe. Also, the scattering flat glass sheet may be disposed at a certain inclination angle with a central axis of the hollow light-guiding pipe, so that the light beam emitted by the light source passes through the scattering flat glass sheet, and then is shot by an output port of the solid light-guiding rod.

Apparently, the above-described embodiments of the present invention are just embodiments for describing the present invention clearly, but not limitation to the implementations of the present invention. For those having ordinary skill in the art, variations or changes in different forms can be made on the basis of the above description. All of the implementations should not and could not be exhaustive herein. Any amendments, equivalent replacements and improvement made within the spirit and principle of the present invention shall all be included within the scope of protection of the claims of the present invention.

What is claimed:

1. An optical system comprising:
   a light source assembly having a light source, a hybrid optical integrator assembly and an object assembly located in a same primary optical axis direction, a concentrated beam being emitted by said light source assembly, becoming uniform via the hybrid optical integrator assembly, and then being shot after entering into the object assembly;
   wherein the hybrid optical integrator assembly comprises an optical integrator and a scattering element disposed on any cross section of the optical integrator and adapted to perform a scattering process to a light beam passing through, wherein said optical integrator comprises a hollow light-guiding pipe having sides each provided with a first through opening, wherein said scattering element comprises a scattering flat glass sheet, wherein said hollow light-guiding pipe is sheathed in a fixing frame having second through openings aligned with respective said first through openings in said hollow light-guiding pipe; wherein said scattering flat glass sheet is inserted through said first and second through openings and scarfing with the hollow light-guiding pipe;
   wherein said light source assembly comprises a reflector adapted as a light concentrating system, the light concentrating system adapted for performing a concentrating process to the light emitted by the light source, and an input end of said optical integrator is located adjacent to a concentrated focus of the light of said light source assembly whereby a light beam having highly concentrated light density and a certain divergence angle is formed at an input port of said hybrid optical integrator assembly;
   a connecting frame attached to the fixing frame;
   wherein said optical integrator is in connection with a mobile driving mechanism via the connecting frame; and
   wherein said hybrid optical integrator assembly is adapted to be moved into and out of a light path between said light concentrating system and said object assembly by said mobile driving mechanism.

2. The optical system according to claim 1, wherein said scattering flat glass sheet is located at a middle position inside the optical integrator, and is disposed perpendicular to an optic axis of the optical integrator.

* * * * *